Feb. 6, 1923. 1,443,966
H. O. POND ET AL.
BRICK HANDLING APPARATUS.
FILED OCT. 26, 1921. 3 SHEETS-SHEET 1

INVENTORS
H. O. POND and
A. W. MELLEN Jr.
BY
Kerr, Page, Cooper & Hayward
ATTORNEYS

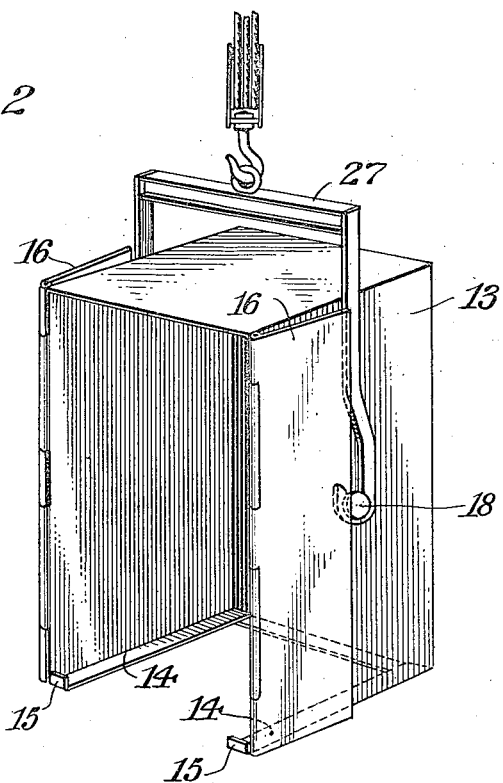
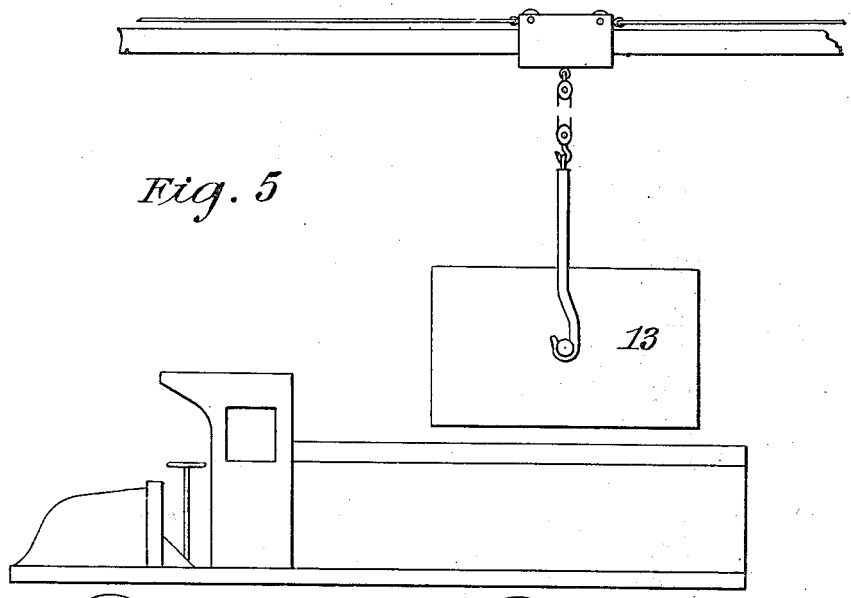

Feb. 6, 1923.

H. O. POND ET AL.
BRICK HANDLING APPARATUS.
FILED OCT. 26, 1921.

INVENTORS
H. O. POND and
A. W. MELLEN, Jr.
BY
Kerr, Page, Cooper & Hayward
ATTORNEYS Patented Feb. 6, 1923.

1,443,966

UNITED STATES PATENT OFFICE.

HENRY O. POND, OF TENAFLY, NEW JERSEY, AND ARTHUR W. MELLEN, JR., OF NEW YORK, N. Y., ASSIGNORS TO RAYMOND CONCRETE PILE COMPANY, OF NEW YORK, N. Y., A CORPORATION OF NEW JERSEY.

BRICK-HANDLING APPARATUS.

Application filed October 26, 1921. Serial No. 510,607.

*To all whom it may concern:*

Be it known that we, HENRY O. POND and ARTHUR W. MELLEN, Jr., both citizens of the United States of America, residing at Tenafly, in the county of Bergen and State of New Jersey, and New York, in the county of Bronx and State of New York, respectively, have invented certain new and useful Improvements in Brick-Handling Apparatus, of which the following is a full, clear, and exact description.

This invention relates to apparatus for handling bricks and other articles and materials, and pertains more particularly to apparatus for carrying unit piles or stacks, (for example piles each containing, say, from two thousand to three thousand bricks) to the storage yard or shed, and from the storage yard or shed to a truck, railway car, or other vehicle, for transportation. The chief object of the invention is to provide simple and efficient apparatus by which the bricks or other articles can be loaded into the truck en masse, so to speak, without damage to the truck or to the articles themselves, and with less manual labor than has heretofore been necessary. To this and other ends the invention consists in the novel features and combinations hereinafter described.

In carrying out our invention in the preferred manner, the bricks are piled in the yard or shed in individual stacks or piles, on movable platforms or pallets of uniform size, the stacks containing preferably the same number of bricks, say twenty-five hundred or three thousand, more or less, according to the capacity of the vehicle in which the bricks are to be transported; the idea being to make each stack a full load. The bricks are piled regularly, on edge in crossed courses, making a stack in the form of a rectangular prism, preferably having a considerably greater altitude than the dimensions of its base so as to economize space in the yard or shed. By means of our invention such stacks are picked up, carried to the truck or other vehicle, and deposited therein, as individual units. For this purpose we provide a receptacle of corresponding shape and of a size to fit over a stack with sufficient clearance for convenient and easy manipulation. Naturally the receptacle or carrier is made strong enough, by design and by choice of materials, to withstand the stresses incident to a load which may be upwards of eight tons, or even more. In the preferred form the front or one side of the carrier is open but provided with double doors, hinged at the sides, and the bottom is open but provided at the sides with inwardly extending shelves, lugs, or the like. The carrier is pivotally suspended on a bail to permit swinging of the carrier from the upright to the horizontal position, and vice versa, and the bail is suspended from the carriage of a traveling crane or other suitable hoisting and conveying mechanism. The doors being open, the carrier is advanced over a stack of bricks, with the inturned shelves or lugs underlying the side edges of the pallet on which the bricks are piled. The doors are then closed and latched. The entire stack is thus enclosed in the carrier, the bottom of which is formed by the pallet, overlying the shelves or flanges, and if the carrier is not too large the stack will not suffer substantial deformation in subsequent handling until it is deposited in the truck. The carrier is now hoisted and carried to a position over the truck, where it is swung to a horizontal position directly above and in register, as it were, with the truck body, and with the doors underneath. The carrier is next lowered into the truck and when it is close to or resting on the bottom thereof the doors are unlatched, whereupon the carrier is slowly raised. As it rises, the doors open gradually under the weight of the load and the bricks pour out upon the truck bottom with insufficient force or impact to cause material injury to themselves or more than ordinary "wear and tear" on the truck. The load having been discharged, the carrier is righted and taken back for another load after removal of the unloaded pallet. In the meantime the loaded truck moves off and an empty truck takes its place. In this way the bricks can be handled with maximum speed and with minimum injury to the bricks and to the trucks. At the same time costly manual labor is largely dispensed with.

In carrying bricks to the storage yard, or in shifting a stack from one part of the yard to another part, the loading of the receptacle is effected in the manner already described, but in transporting the load the receptacle is not tilted. Instead, it is maintained in its loading position and simply lowered (at the unloading point) until the pallet rests on the sills or other supports arranged to receive it, after which the doors are opened and the receptacle is backed off, leaving the stack in its new location.

The embodiment outlined above is illustrated in the accompanying drawings, in which—

Fig. 2 is a perspective view of the carrier suspended in upright position with its intake and discharge side open, ready to be moved over a "unit" stack of bricks.

Fig. 5 is a side view showing the carrier suspended in horizontal position over a truck, ready to be lowered into the latter.

Figure 1:
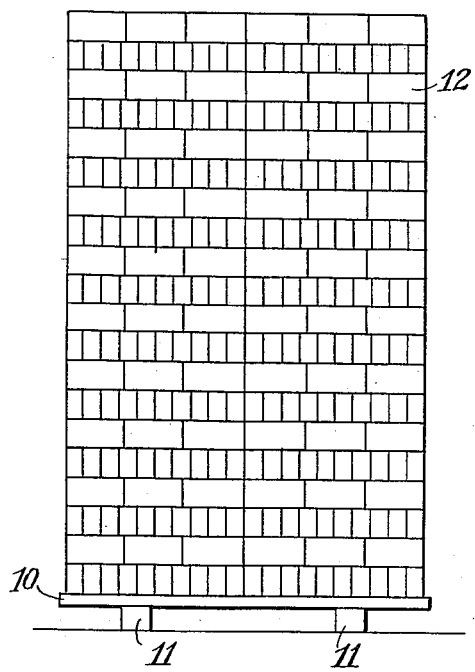
Fig. 1 is a front view of a stack of bricks piled in crossed courses on a movable platform or pallet, for convenient handling as a unit by means of our invention.
Figure 3:
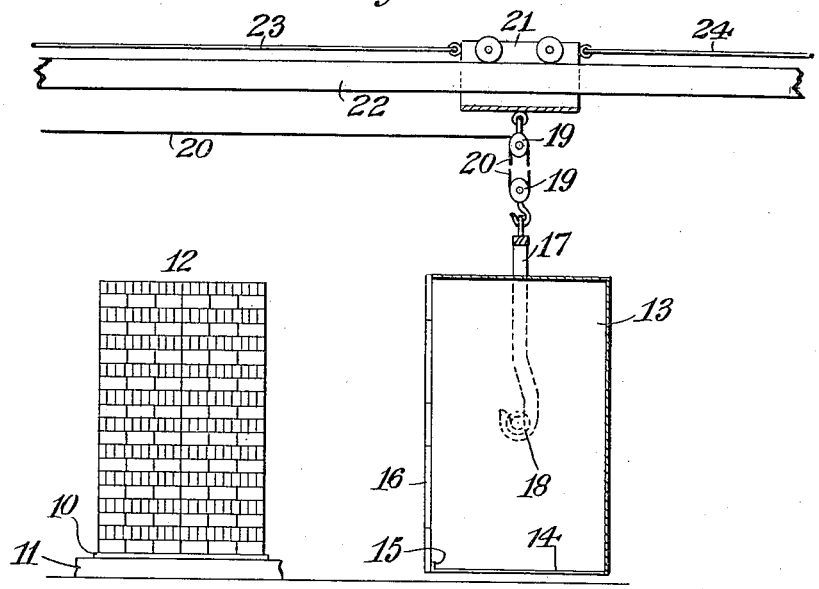
Fig. 3 is a side view, showing the carrier (in vertical section) ready to be moved over the stack.

The bricks to be handled by our apparatus are piled on a movable platform or pallet 10, Fig. 1, supported a suitable distance above the ground or floor by any convenient means, as sills 11, which, if of the proper length may be fastened to and form a part of the pallet. The bricks are preferably piled regularly in crossed courses, as indicated, to form a stack 12 in the form of a prism of rectangular horizontal section and of greater height than the side of its base. In Figs. 1 and 3 a stack is shown composed of twenty courses each containing a hundred and twenty bricks. A twenty-first course (not shown) lacking twenty bricks, can be laid on top to bring the total number up to an even twenty-five hundred.

The carrier 13 is in the form of a rectangular box, slightly larger in all its dimensions than the stack of bricks, and composed preferably of a frame of steel shapes to which steel plates are riveted or otherwise secured. One end (the lower end, or bottom when the carrier is suspended in vertical position) is open, as shown in Fig. 2, but at the lower edges of the sides, and at the back also if desired, are inwardly extending flanges or shelves 14. At the front the flanges may be bent up to form stops 15 for the purpose explained hereinafter.

The front of the carrier 13 is open, but is provided with suitable closure means which is, at least in effect, removable, so that the front may be opened or closed at will. In the present instance the closure consists of two steel doors, 16, hinged to the sides of the box, at the front, in such manner that they may be swung back flat against the sides as in Fig. 2. Suitable catches, not shown, may be provided to hold the doors in that position if necessary or desirable.

The carrier 13 is suspended by means of a bail 17, in the present instance having hooked ends releasably engaging studs 18 on the sides of the box. The bail is suspended by means of blocks 19 and cable 20 from a carriage 21 mounted to travel on a horizontal member or rail 22, with oppositely extending lines 23, 24, for moving the carriage. The member 22 may be understood to represent the cross rail or rails of a traveling crane, so that the suspended carrier can be moved down along a row of brick stacks and also toward and from the row, to pick up the stacks in succession or any selected stack.

Figure 4:
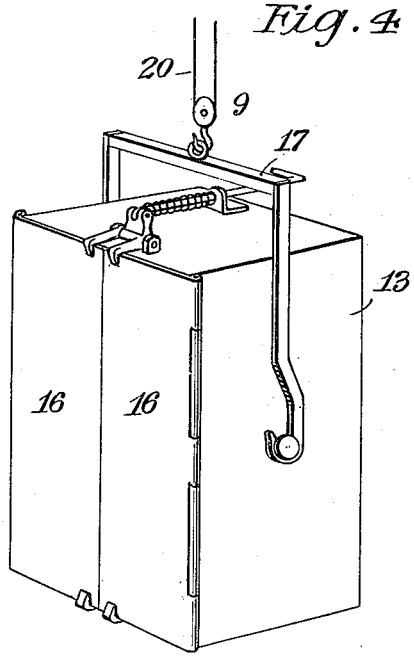
Fig. 4 is a perspective view showing the loaded carrier in vertical position with the intake and discharge side closed and the doors latched.
Figure 6:
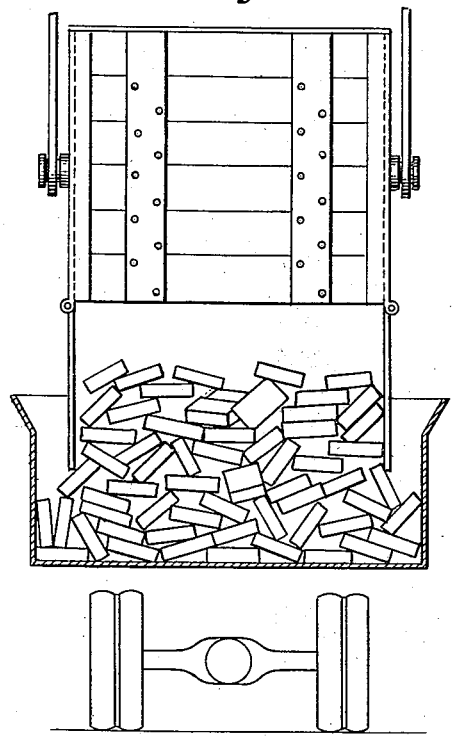
Fig. 6 is a rear view showing the carrier being raised and its load of bricks being discharged into the truck.

With the doors open the carrier is brought up to the stack as in Fig. 3, and is moved over the same, the flanges 14 passing under the edges of the pallet 10 until the carrier has "swallowed" the entire stack. The doors are then closed and latched, as in Fig. 4, and the carrier is raised by means of the line 20, the pallet then resting on the flanges 14, behind the stops 15. The carrier is now run back to a position over the truck, Fig. 5, and is lowered and swung to the horizontal until it is close to or rests on the truck floor, with the doors underneath, after which the doors are unlatched and the carrier raised. As the carrier rises, the doors open gradually and the bricks pour out as in Fig. 6, coming to rest in the truck with comparatively little impact on the truck and on themselves. As soon as the carrier is free the truck can be driven off and the carrier returned for another load. The pallet is retained in the carrier by the lugs 15 but is of course removed to permit the next pile of bricks to be picked up.

Figure 9:
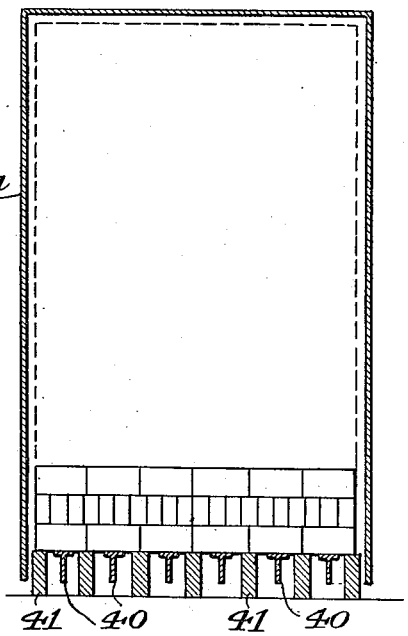
Fig. 9 is a section on line 9—9 of Fig. 8, showing the carrier illustrated in Figs. 7 and 8 in position over a stack of bricks.
Figure 7:
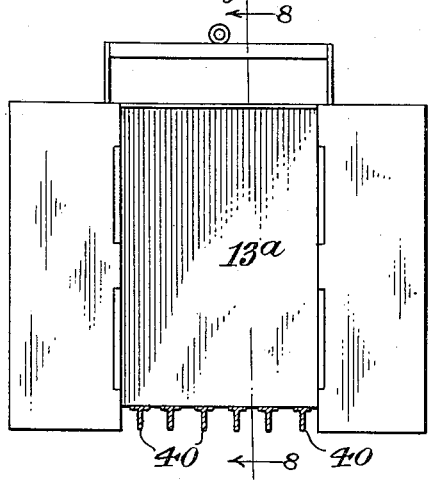
Fig. 7 is a front view of a modified form of carrier.
Figure 8:
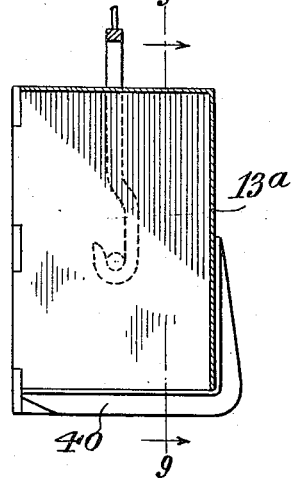
Fig. 8 is a section on line 8—8 of Fig. 7.

In the embodiment illustrated in Figs. 7, 8 and 9 the carrier 13ª has a bottom composed of laterally spaced fingers 40, securely mounted on the back of the carrier and extending forwardly therefrom. For handling by such a construction the bricks are stacked on sills 41, Fig. 9, between which the fingers pass as the carrier is moved over the stack, as clearly indicated in Fig. 9. When the carrier is raised the stack is lifted off the sills by the fingers, which, as will be seen, underlie the transverse rows of bricks constituting the lower course. Obviously the fingers should be wide enough, or the carrier should fit the stack closely enough, or both, to prevent the bricks falling out between the fingers. In other respects the construction and operation of the carrier can be the same as described in connection with Figs. 1 to 6 inclusive.

It is to be understood that the invention is not limited to the specific constructions herein illustrated and described but can be embodied in other forms without departure from its spirit.

We claim:

1. In an apparatus for handling bricks and other articles piled in stacks, a receptacle constituting a carrier, having a front opening to receive and discharge the stack as a unit, releasable means for closing said front opening to confine the articles in the carrier during transportation, means associated with the bottom of the carrier to support the artitcles in the carrier but permitting the carrier to be loaded by horizontal movement over the stack, and a pivoted support for the carrier whereby the carrier may be swung to permit discharge of the articles downwardly by gravity through said front opening.

2. In an apparatus for handling bricks and other articles piled in stacks, a receptacle constituting a carrier, having an open front and bottom to permit the carrier to be moved horizontally over a stack of articles piled on a movable pallet, means at the bottom of the carrier to underlie and support the loaded pallet, releasable closure means for said open front to confine the articles in the carrier during transportation, and supporting means pivotally connected with the carrier to permit tilting thereof to discharge the articles downwardly by gravity through said open front.

3. In an apparatus for handling bricks and other articles piled in stacks, a carrier in the form of a box having an open front and bottom, inwardly extending flanges at the lower edges of the sides of the carrier to pass under the side edges of a loaded pallet to lift and support the same, doors for the front of the carrier, hinged to the sides thereof, releasable means for holding the doors closed, and a hanger for lifting and transporting the carrier, pivoted to the latter to permit the same to swing from upright loading position to horizontal discharging position, and vice versa.

4. In an apparatus for handling bricks and other articles piled in stacks, a carrier in the form of a rectangular box having an open front and bottom and permanently closed sides, back and top, doors hinged to the sides of the box at the front thereof to close the front at will, releasable means for holding the doors in closed position, means at the sides of the open bottom to underlie and support a loaded pallet at the edges thereof, and a bail in which the box is pivotally mounted to swing from upright loading position to horizontal discharging position and vice versa.

5. In an apparatus for handling bricks and other articles piled in stacks on movable pallets, a receptacle constituting a carrier having an open front, through which to receive and discharge the stack, and an open bottom provided with means for supporting the pallet by the edges thereof, releasable means for closing the front of the carrier to confine the articles therein, and means for lifting and transporting the receptacle.

6. In an apparatus for handling bricks and other articles piled in stacks on movable pallets, a receptacle constituting a carrier having an opening through which to receive and discharge the stack and pallet and provided with means for preventing escape of articles singly or en masse through said opening during transportation of the receptacle but releasable at will to permit discharge of the articles through the same opening, and means for moving the receptacle over the stack to load the receptacle through said opening and for transporting the loaded receptacle to the unloading point.

7. In an apparatus for handling bricks and other articles, a receptacle having a side opening through which it is both loaded and unloaded, releasable means for closing said side opening, and supporting and transporting means for said receptacle, to permit the receptacle to be moved laterally over a stack of bricks.

In testimony whereof we hereto affix our signatures.

HENRY O. POND.
ARTHUR W. MELLEN, JR.